US009752505B2

(12) United States Patent
Roh et al.

(10) Patent No.: US 9,752,505 B2
(45) Date of Patent: Sep. 5, 2017

(54) SUPPORTING DEVICE FOR GAS TURBINE (71) Applicant: Doosan Heavy Industries & Construction Co., Ltd., Changwon-Si, Gyeongsangnam-Do (KR)

(72) Inventors: U Jin Roh, Yuseong-gu (KR); Sang Eon Lee, Yuseong-gu (KR); Kyung Kook Kim, Yuseong-gu (KR)

(73) Assignee: Doosan Heavy Industries & Construction Co., Ltd., Gyeongsangnam-do (KR)

( * ) Notice: Subject to any disclaimer, the term of this patent is extended or adjusted under 35 U.S.C. 154(b) by 625 days.

(21) Appl. No.: 14/221,725

(22) Filed: Mar. 21, 2014

(65) Prior Publication Data

US 2014/0283529 A1 Sep. 25, 2014

(30) Foreign Application Priority Data

Mar. 22, 2013 (KR) ........................ 10-2013-0030902

(51) Int. Cl.
*F01D 25/28* (2006.01)
*F02C 7/20* (2006.01)
*F02C 7/32* (2006.01)

(52) U.S. Cl.
CPC ................ *F02C 7/20* (2013.01); *F01D 25/28* (2013.01); *F02C 7/32* (2013.01); *F05D 2240/14* (2013.01); *F05D 2240/90* (2013.01); *Y10T 29/49998* (2015.01)

(58) Field of Classification Search
CPC .......... B23Q 3/18; B23Q 3/183; B23Q 3/186; B64D 27/10; Y10T 29/49998; Y10T 29/53961; F02C 7/20; F02C 7/32; F01D 25/28; F01D 25/285; F05D 2240/90; F05D 2240/91; B25B 7/00; B25B 11/00; B23P 19/00; B23P 19/10; B23P 21/00; B23P 23/00
USPC .......................... 29/281.1; 269/35, 37, 289 R
See application file for complete search history.

(56) References Cited

U.S. PATENT DOCUMENTS

| | | | | |
|---|---|---|---|---|
| 3,268,093 A | * | 8/1966 | Keiter .................... | B23Q 3/157 414/560 |
| 4,053,189 A | * | 10/1977 | Novotny ................. | F01D 25/28 384/476 |
| 4,295,257 A | * | 10/1981 | Strohs ..................... | B23P 19/04 269/43 |
| 4,461,455 A | * | 7/1984 | Mills ......................... | B64F 5/50 180/125 |
| 5,575,607 A | * | 11/1996 | Grout ...................... | B66C 19/00 212/344 |
| 5,645,389 A | * | 7/1997 | Lilja ....................... | B65D 85/68 206/319 |

(Continued)

FOREIGN PATENT DOCUMENTS

JP H08270405 A 10/1996
JP 2008-184966 A 8/2008

*Primary Examiner* — Jermie Cozart
(74) *Attorney, Agent, or Firm* — Harness, Dickey & Pierce, P.L.C.

(57) ABSTRACT

A supporting device for a gas turbine includes a base frame; a fixing member installed on the base frame so as to support one end of a gas turbine; and an absorbing member installed on the base frame so as to support the other end of the gas turbine. The absorbing member having lower stiffness than the fixing member so as to deform in first and second directions when the gas turbine thermally expands.

17 Claims, 6 Drawing Sheets

(56) References Cited

U.S. PATENT DOCUMENTS

| | | | | |
|---|---|---|---|---|
| 5,722,512 A * | 3/1998 | Lilja | ............... | B64F 5/50 |
| | | | | 187/244 |
| 5,816,367 A * | 10/1998 | Lilja | ............... | F01D 25/285 |
| | | | | 187/244 |
| 6,170,141 B1 * | 1/2001 | Rossway | ............... | F01D 25/285 |
| | | | | 206/319 |
| 7,036,318 B1 * | 5/2006 | Munson, Jr. | ............... | F01D 15/10 |
| | | | | 60/39.281 |
| 7,963,542 B2 * | 6/2011 | Doll | ............... | B62D 63/061 |
| | | | | 280/404 |
| 8,057,140 B2 * | 11/2011 | Entwistle | ............... | B65D 19/44 |
| | | | | 410/47 |
| 2007/0131839 A1 * | 6/2007 | Dunn | ............... | B63H 21/16 |
| | | | | 248/637 |
| 2008/0011932 A1 * | 1/2008 | Stretton | ............... | B66C 1/10 |
| | | | | 248/544 |
| 2009/0064685 A1 * | 3/2009 | Busekros | ............... | F01D 25/28 |
| | | | | 60/797 |
| 2009/0294625 A1 * | 12/2009 | Fernley | ............... | F01D 25/285 |
| | | | | 248/671 |
| 2010/0272558 A1 * | 10/2010 | Black | ............... | F01D 25/162 |
| | | | | 415/142 |
| 2013/0199009 A1 * | 8/2013 | Holmes | ............... | B25B 11/00 |
| | | | | 29/281.4 |
| 2013/0306830 A1 * | 11/2013 | Acuna | ............... | F16M 3/00 |
| | | | | 248/558 |

* cited by examiner

SUPPORTING DEVICE FOR GAS TURBINE

CROSS-REFERENCE(S) TO RELATED APPLICATIONS

This application claims priority to Korean Patent Application No. 10-2013-0030902, filed on Mar. 22, 2013, the disclosure of which is incorporated herein by reference in its entirety.

BACKGROUND OF THE INVENTION

Field of the Invention

Some example embodiments relate to a supporting device for a gas turbine and/or a gas turbine with the same, and more particularly, to a supporting device for stably supporting a gas turbine in an installation place and/or a gas turbine with the same.

Description of the Related Art

In general, a gas turbine includes a compressor, a combustor, and a turbine. The compressor sucks external air, compresses the sucked air at high temperature and high pressure, and then transfers the compressed air to the combustor. The combustor mixes the introduced compressed air with fuel, combusts the mixture to generate high-temperature and high-pressure gas, and transfers the generated high-temperature and high-pressure gas to the turbine.

In this way, the high-temperature and high-pressure gas transferred from the combustor rotates a rotating shaft of the turbine while passing through a moving blade of the turbine, and drives a generator to generate power. Furthermore, a reducer for reducing a rotational force is connected to the front of one side of the compressor, and components included in the gas turbine are supported by the top of a base frame.

Since the gas turbine is exposed to high-temperature combustion gas during operation, thermal expansion inevitably occurs. Thus, the base frame should absorb the thermal expansion of the gas turbine. In this case, the structure of a supporting device for supporting the gas turbine may become complex.

SUMMARY OF THE INVENTION

At least one embodiment relates to a supporting device for a gas turbine.

In one embodiment, the supporting device for a gas turbine includes: a base frame; a fixing member installed on the base frame so as to support one end of a gas turbine; and an absorbing member installed on the base frame so as to support the other end of the gas turbine, and having lower stiffness than the fixing member so as to deform in first and second directions when the gas turbine thermally expands.

The gas turbine may include a reducer housing and a compressor suction duct, and the fixing member may include a first fixing member configured to fasten to the reducer housing and a second fixing member configured to fasten to the compressor suction duct.

The first direction extends along a direction parallel to a longitudinal section of the gas turbine, and the second direction extends along an axial direction of the gas turbine.

The gas turbine may include a turbine housing, and the absorbing member may include a first moving part configured to fasten to the turbine housing and deform along the first direction and a second moving part configured to deform along the second direction.

The second moving part may be inclined toward the fixing member. Thus, when the gas turbine thermally expands in the axial direction, the second moving part may be positioned to cross the base frame at right angles.

The first moving part may include a plate-shaped support panel parallel to the second direction.

The second moving part may include a plate-shaped moving panel having a top and a bottom, the top is fastened to the first moving member through a connection member and the bottom is fastened to the base frame through a base member and a mounting member, and the moving panel is perpendicular to the support panel.

The connection member may include: a horizontal plate; a first fastening piece formed on a top surface of the horizontal plate and fastened to the support panel; and a second fastening piece formed on a bottom surface of the horizontal plate and fastened to the moving panel.

The supporting device may further include one or more height adjusting pads provided between the base member and the mounting member.

The base member may include a flange mounted on the base frame and a protruding mounting surface protruding from a top surface of the flange such that the mounting member is fastened to the protruding mounting surface.

The mounting member may include a mounting plate fastened to the protruding mounting surface and a mounting piece fastened to the bottom of the moving panel.

The absorbing member may include a pair of absorbing members, and a limitation member provided between the pair of absorbing members so as to limit thermal expansion of the gas turbine.

When the thermal expansion of the gas turbine becomes larger than a value, the limitation member may come in contact with the surface of the gas turbine so as to limit the thermal expansion of the gas turbine.

The limitation member may be positioned offset from the shaft center of the gas turbine.

The limitation member may include a mounting flange mounted on the base frame and a pair of movement limitation posts disposed on the mounting flange.

The movement limitation posts may have a pad provided on an upper inner surface thereof.

The top portion of the movement limitation post is formed to have a slope toward the axial center.

At least one embodiment relates to a gas turbine supported by a supporting device as described above.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF EXAMPLE EMBODIMENTS

The inventive concepts now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "\".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present disclosure, and will not be interpreted in an idealized or overly formal sense unless expressly so defined herein.

A supporting device for a gas turbine and a gas turbine with the same according to example embodiments will be described below in more detail with reference to the accompanying drawings.

Figure 1:
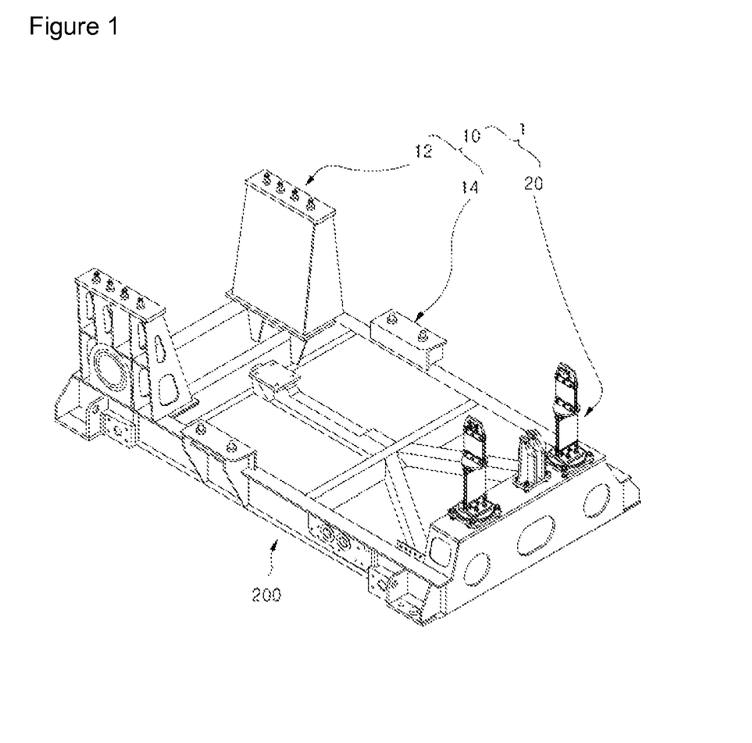
FIG. 1 is a schematic perspective view of a supporting device for a gas turbine in accordance with an embodiment.
Figure 2:
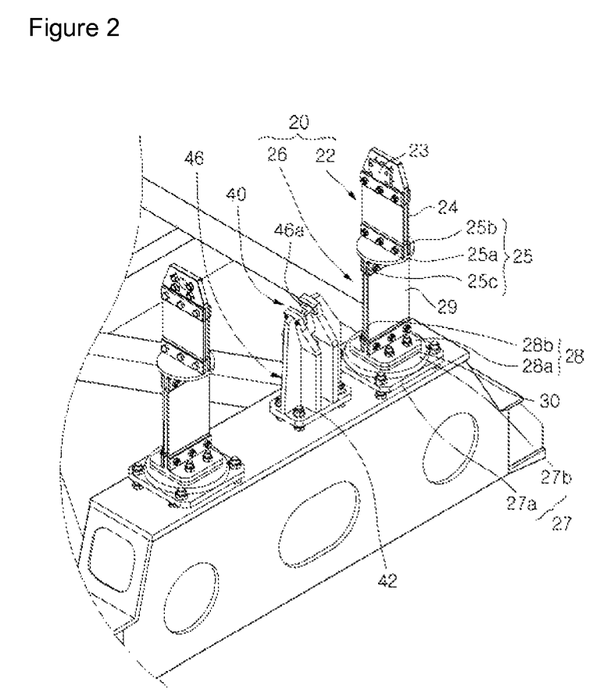
FIG. 2 is a expanded perspective view of an absorbing member of the supporting device illustrated in FIG. 1.
Figure 3:
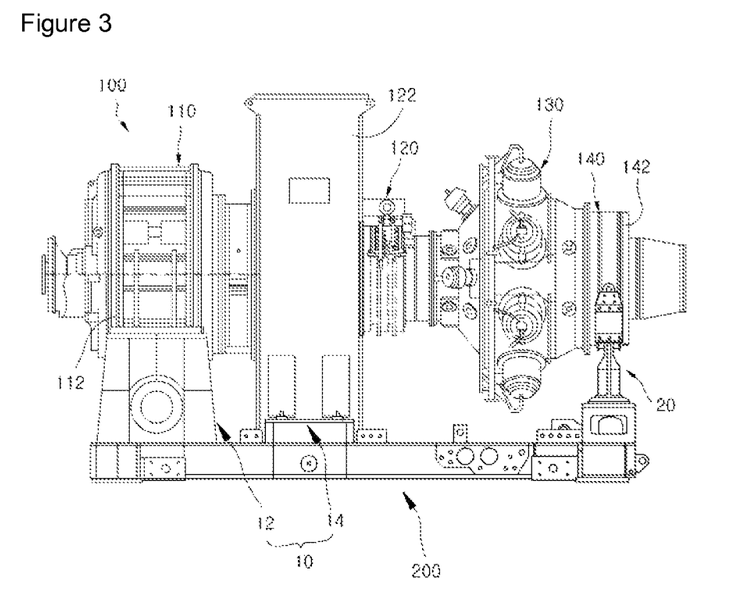
FIG. 3 is a front view of a gas turbine having the supporting device illustrated in FIG. 1.

Referring to FIGS. 1 to 3, a supporting device for a gas turbine according to an embodiment includes a base frame 200 and a supporting unit 1 capable of accepting thermal expansion which occurs in a circumferential direction and an axial direction, due to thermal expansion of a gas turbine 100. The gas turbine 100 includes a reducer 110, a compressor 120, a combustor 130, and a turbine 140, which are sequentially arranged.

The gas turbine to which the present invention may be applied is not limited to that illustrated in the drawings, and the present invention may be applied to any type of gas turbine having an outer shape which may be supported by the supporting unit 1.

The supporting unit 1 includes a fixing member 10 and an absorbing member 20 installed on the base frame 200. The fixing member 10 is installed on the base frame 200 so as to be positioned at the front end of the gas turbine 100, that is, at the side of the reducer 110. The absorbing member 20 is installed on the base frame 200 so as to be positioned at the rear end of the gas turbine 100, that is, at the side of the turbine 140. The absorbing member 20 is formed to have lower stiffness than the fixing member 10. Thus, when the gas turbine thermally expands, the fixing member 10 maintains almost the same shape as the gas turbine is not operated, but the absorbing member 20 is deformed by an amount corresponding to the thermal expansion of the gas turbine.

That is, supporting members are provided at the front and rear of the gas turbine, and one of the supporting members is formed to have a flexible structure. Thus, the supporting unit may reduce or substantially prevent the occurrence of excessive stress caused by thermal expansion.

Therefore, in order to reduce or minimize deformation even though the gas turbine thermally expands, the fixing member 10 is formed to have high stiffness, using a plurality of panels constructed in a rectangular box shape. Specifically, the fixing member 10 includes a first fixing member 12 and a second fixing member 14. The first fixing member 12 has a flange coupled to both side ends of a reducer housing 112 of the gas turbine 100, and the second fixing member 14 has a flange coupled to both side ends of a suction duct 122 of the compressor 120.

The second fixing member 14 is disposed at a position separated from the first fixing member 12 along the rear of the gas turbine. Furthermore, the first and second fixing members 12 and 14 are formed to have high stiffness such that deformation thereof is reduced or minimized even through the gas turbine thermally expands.

Thus, the reducer of the gas turbine and the suction duct of the compressor, which are positioned at the front of the base frame, are reliably supported by the first and second fixing members. When the gas turbine thermally expands, the positions of a leading end and a tail end of the gas turbine are change by the thermal expansion, but the positions of connections between the first and second fixing members and the gas turbine are almost constantly maintained.

The absorbing member 20 includes a first moving part 22 and a second moving part 26. The first moving part 22 is fastened to both side ends of a turbine housing 142 of the gas turbine 100 and deformed (or flexed) to correspond to radial expansion of the turbine housing 142, caused by the thermal expansion, and the second moving part 26 is disposed under the first moving part 22 and deformed (or flexed) to correspond to axial expansion of the gas turbine 100.

In other words, the absorbing member 20 has such a structure that is deformed in two different directions so as to correspond to both of the radial expansion and the axial expansion of the gas turbine 100. In the illustrated example, the two directions are set to the radial direction and the axial direction. However, the example embodiments are not limited thereto, but the two directions may be set to two arbitrary directions. The thermal expansion in the circumferential direction and the thermal expansion in the axial direction may be dealt with by one member having a simple structure, instead of separate members. Thus, the installation and maintenance may be easily conducted.

The second moving part 26 may be disposed to be inclined toward the front of the gas turbine 100. Thus, when deformation occurs in the axial direction due to the thermal expansion, the second moving part 26 may not be inclined but disposed in a direction which is roughly perpendicular to the base frame. That is, as the second moving part 26 is disposed to be inclined toward the front of the gas turbine 100 through data, (e.g. previously calculated in consideration of the thermal expansion in the axial direction, provided through measurement, determined by empirical study, etc.) the second moving part 26 may be positioned roughly perpendicular to the base frame. Such a structure may stably support the gas turbine even in a state where the second moving part 26 is deformed due to the thermal expansion.

Figure 5A:
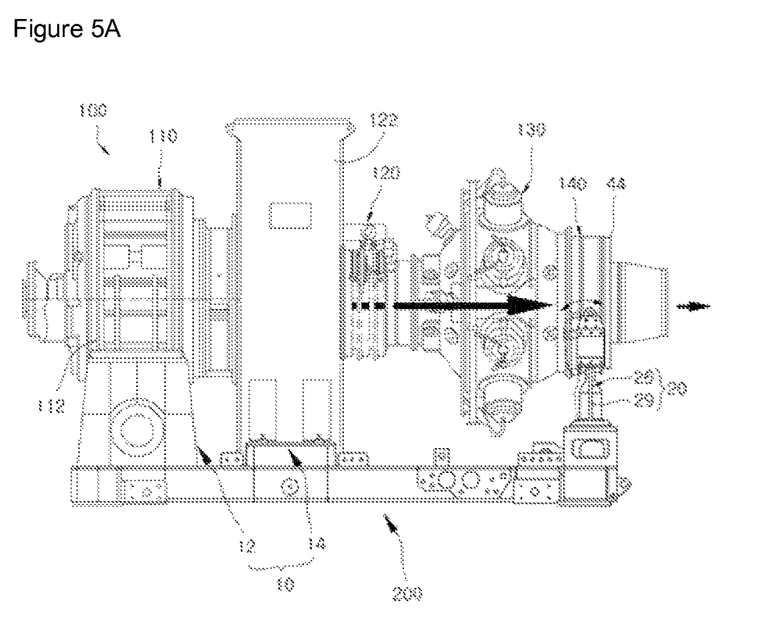
FIG. 5A is a front view illustrating a state in which the gas turbine thermally expands in an axial direction.
Figure 5B:
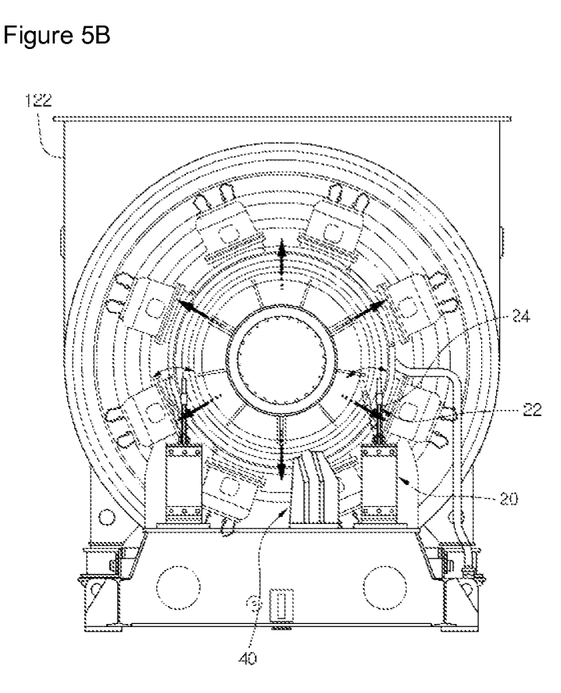
FIG. 5B is a side view illustrating a state in which the gas turbine thermally expands in a circumferential direction.

The first moving part 22 includes a support panel 24 aligned along the axial direction of the gas turbine. The top of the support panel 24 is fastened and fixed to the turbine housing 142 through a fastening bracket 23, and the bottom of the support panel 24 is fastened to the second moving part 26 through a connection member 25 so as to be positioned in a direction crossing the second moving part 26. Thus, when the gas turbine thermally expands in the radial direction, the support panel 24 is deformed along the radial direction of the gas turbine so as to reduce or minimize the occurrence of stress caused by the thermal expansion (FIG. 5B).

Furthermore, when the fastening bracket is fastened and fixed to the top of the support panel, a separate member may be fastened and fixed together, depending on space or assembly. Depending on cases, the fastening bracket may be omitted, and the top of the support panel may be directly fastened to the turbine housing.

The second moving part 26 includes a moving panel 29 aligned along the radial direction of the gas turbine. The top of the moving panel 29 is fastened to the first moving part 22 through the connection member 25 so as to be positioned in a direction crossing the first moving part 22, and the bottom of the moving panel 29 is mounted on a base member 27 through a mounting member 28 mounted on the base frame 200. That is, when the gas turbine thermally expands in the axial direction, the moving panel 29 is deformed along the axial direction so as to reduce or minimize the occurrence of stress (FIG. 5A).

The connection member 25 includes a horizontal plate 25a, a first fastening piece 25b, and a second fastening piece 25c. The horizontal plate 25a has a plate shape, the first fastening piece 25b is formed on the top surface of the horizontal plate 25a and fastened to the support panel 24 through a bolt and nut, and the second fastening piece 25c is formed on the bottom surface of the horizontal plate 25a and fastened to the moving panel 29 through a bolt and nut. The first and second fastening pieces 25b and 25c are disposed to cross each other at right angles. That is, the connection member 25 serves to fasten the support panel and the moving panel such that the support panel and the moving panel are deformed in the circumferential direction and the axial direction, respectively, in a state where the support panel and the moving panel are connected to each other.

Between the base member 27 and the mounting member 28, one or more height adjusting pads 30 may be provided. The height adjusting pad 30 may be formed of an elastic material. When the gas turbine is deformed in a vertical direction (based on FIG. 2) during the thermal expansion, the height adjusting pad 30 may be deformed to correspond to such a deformation. Thus, the occurrence of stress in the vertical direction may be minimized. In the illustrated example, one height adjusting pad is included. However, a plurality of height adjusting pads may be included.

The base member 27 includes a flange 27a and a protruding mounting surface 27b. The flange 27a is mounted on the base frame 200 through bolts and nuts, and the protruding mounting surface 27b is formed to protrude from the top surface of the flange 27a such that the mounting member 28 is fastened to the protruding mounting surface 27b. At this time, the protruding mounting surface 27b is formed to protrude from the top surface of the flange 27a such that the height is more smoothly adjusted and the stress reduction effect is increased.

The mounting member 28 includes a mounting plate 28a and a mounting piece 28b. The mounting plate 28a is fastened to the protruding mounting surface 27b through bolts and nuts, and the mounting piece 28b is formed on the top surface of the mounting plate 28a and fastened to the bottom of the moving panel 29 through bolts and nuts.

The support panel 24 and the moving panel 29 may be formed of an elastic material such as spring steel, which has a high supporting force while easily deformed according to the thermal expansion of the gas turbine.

In the illustrated example, each of the support panel 24 and the moving panel 29 is provided as one panel. Depending on cases, however, a plurality of panels may be stacked. Such a structure may stably support the gas turbine while having a sufficient elasticity.

The absorbing member 20 is provided as a pair of absorbing members. Between the pair of absorbing members, a limitation member 40 may be provided to limit the deformation of the gas turbine. The limitation member 40 may be positioned to deviate from the axial center of the gas turbine in the radial direction.

Specifically, when the gas turbine thermally expands in a particular (or, alternatively a predetermined) range or more, the limitation member 40 comes in contact with the gas turbine so as to limit additional thermal expansion. Thus, during operation, the gas turbine may be stably supported regardless of the thermal expansion of the gas turbine.

Furthermore, the limitation member 40 does not coincide with the axial center of the gas turbine, but is positioned offset or deviating from the axial center of the gas turbine. Thus, even when the gas turbine is distorted by irregular thermal expansion, the limitation member 40 may limit the distortion within a particular (or, alternatively a predetermined) range.

Figure 4:
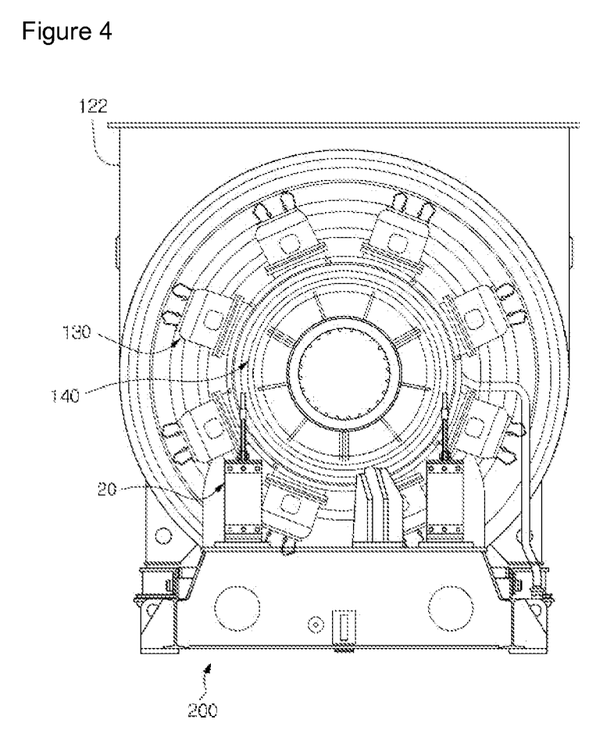
FIG. 4 is a side view illustrating one side surface of the gas turbine illustrated in FIG. 3.

The limitation member 40 includes a mounting flange 42 and a pair of movement limitation posts 46. The mounting flange 42 is mounted on the base frame 200 through bolts and nuts, and the pair of movement limitation posts 46 are formed at both sides of the mounting flange 42 such that a movement prevention bump 44 (see FIG. 4) mounted on the turbine housing 142 is inserted therebetween. The pair of movement limitation posts 46 are disposed to be separated at a desired (or, a alternatively predetermined) distance from each other.

That is, the movement prevention bump mounted on the turbine housing is not fastened to the movement limitation posts, but separated from the movement limitation posts by a desired (or, alternatively predetermined) distance provided therebetween. When the thermal expansion of the gas turbine becomes equal to or more than a particular (or, alternatively a predetermined) amount, the movement prevent bump may prevent additional thermal expansion of the gas turbine while coming in contact with any one or both of the movement limitation posts.

Furthermore, the movement limitation posts 46 may include a pad 46a provided on an upper inner surface thereof. The pad 46a serves to reduce friction when the movement limitation posts 46 are contacted with the movement prevention bump 44 provided in the gas turbine.

In addition, the top of the movement limitation post 46 may be included toward the axial center of the gas turbine, because the top of the movement limitation post 46 does not coincide with the axial center, but is positioned to deviate from the axial center. At this time, since the top of the movement limitation post 46 is inclined toward the axial center, a larger restoring force may be applied to the gas turbine than when the gas turbine is distorted.

While the present invention has been described with respect to example embodiments, it will be apparent to those skilled in the art that various changes and modifications may be made without departing from the spirit and scope of the invention as defined in the following claims.

What is claimed is:

1. A supporting device for a gas turbine, comprising:
    a base frame;
    a fixing member installed on the base frame so as to support one end of a gas turbine; and
    an absorbing member installed on the base frame so as to support the other end of the gas turbine, and having lower stiffness than the fixing member so as to deform in first and second directions when the gas turbine thermally expands.

2. The supporting device according to claim 1, wherein the gas turbine comprises a reducer housing and a compressor suction duct, and the fixing member comprises:
    a first fixing member configured to fasten to the reducer housing; and
    a second fixing member configured to fasten to the compressor suction duct.

3. The supporting device according to claim 1, wherein the first direction extends along a direction parallel to a longitudinal section of the gas turbine, and the second direction extends along a radial direction of the gas turbine.

4. The supporting device according to claim 3, wherein the gas turbine comprises a turbine housing, and the absorbing member comprises:
    a first moving part configured to fasten to the turbine housing and deform along the first direction; and
    a second moving part configured to deform along the second direction.

5. The supporting device according to claim 4, wherein the second moving part is inclined toward the fixing member.

6. The supporting device according to claim 4, wherein the first moving part comprises a plate-shaped support panel parallel to the second direction.

7. The supporting device according to claim 6, wherein the second moving part comprises a plate-shaped moving panel having a top and a bottom, the top is fastened to the first moving part through a connection member and the bottom is fastened to the base frame through a base member and a mounting member, and the moving panel is perpendicular to the support panel.

8. The supporting device according to claim 7, wherein the connection member comprises:
    a horizontal plate;
    a first fastening piece formed on a top surface of the horizontal plate and fastened to the support panel; and
    a second fastening piece formed on a bottom surface of the horizontal plate and fastened to the moving panel.

9. The supporting device according to claim 7, further comprising:
    one or more height adjusting pads provided between the base member and the mounting member.

10. The supporting device according to claim 9, wherein the base member comprises:
    a flange mounted on the base frame; and a protruding mounting surface protruding from a top surface of the flange such that the mounting member is fastened to the protruding mounting surface.

11. The supporting device according to claim 10, wherein the mounting member comprises:
    a mounting plate fastened to the protruding mounting surface; and
    a mounting piece fastened to the bottom of the moving panel.

12. The supporting device according to claim 1, wherein the absorbing member comprises:
    a pair of absorbing members; and
    a limitation member provided between the pair of absorbing members so as to limit thermal expansion of the gas turbine.

13. The supporting device according to claim 12, wherein when the thermal expansion of the gas turbine becomes larger than a value, the limitation member comes in contact with the surface of the gas turbine so as to limit the thermal expansion of the gas turbine.

14. The supporting device according to claim 13, wherein the limitation member is positioned offset from the shaft center of the gas turbine.

15. The supporting device according to claim 14, wherein the limitation member comprises:
    a mounting flange mounted on the base frame; and
    a pair of movement limitation posts disposed on the mounting flange.

16. The supporting device according to claim 15, wherein the movement limitation posts have a pad provided on an upper inner surface thereof.

17. The supporting device according to claim 15, wherein the top portion of the movement limitation post is formed to have a slope toward the axial center.

* * * * *